Oct. 29, 1963  E. T. LUMB  3,108,478
WHEEL BALANCING DEVICE
Filed Sept. 9, 1960  3 Sheets-Sheet 1

INVENTOR.
Edwin T. Lumb
BY
Attorney

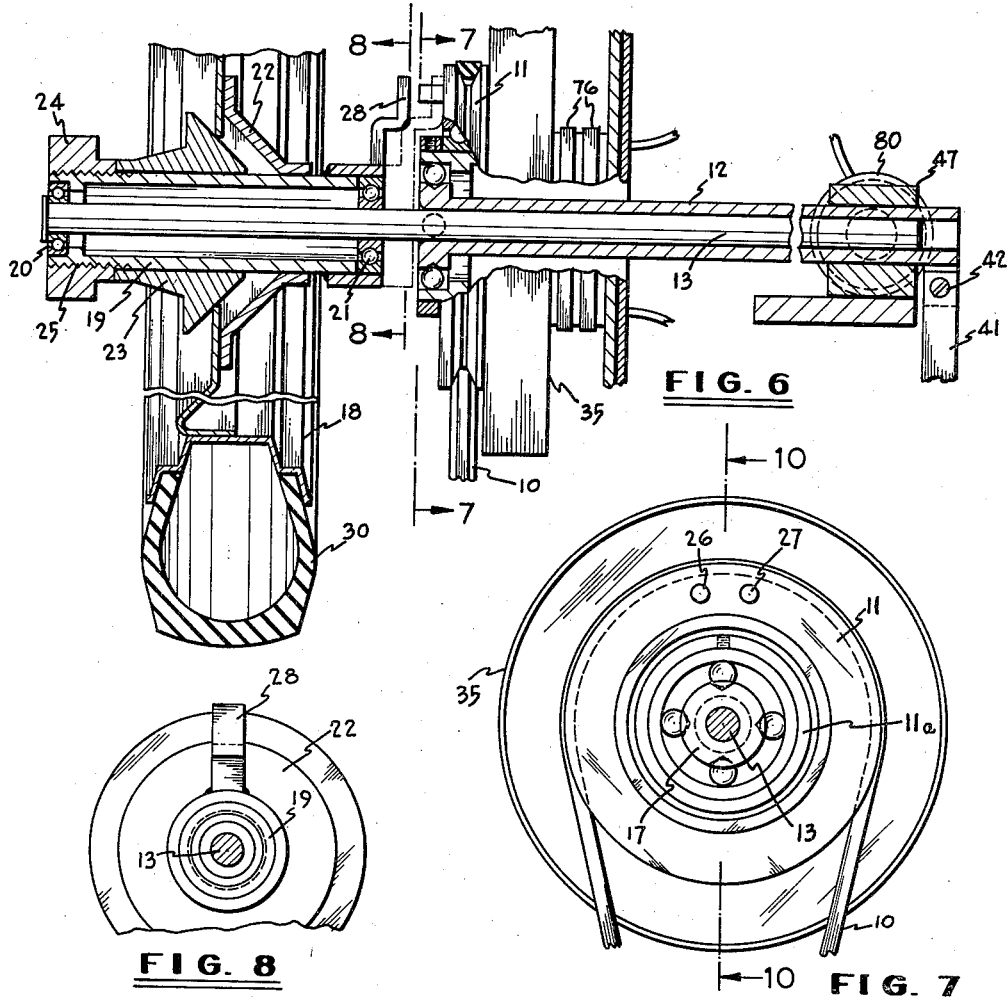
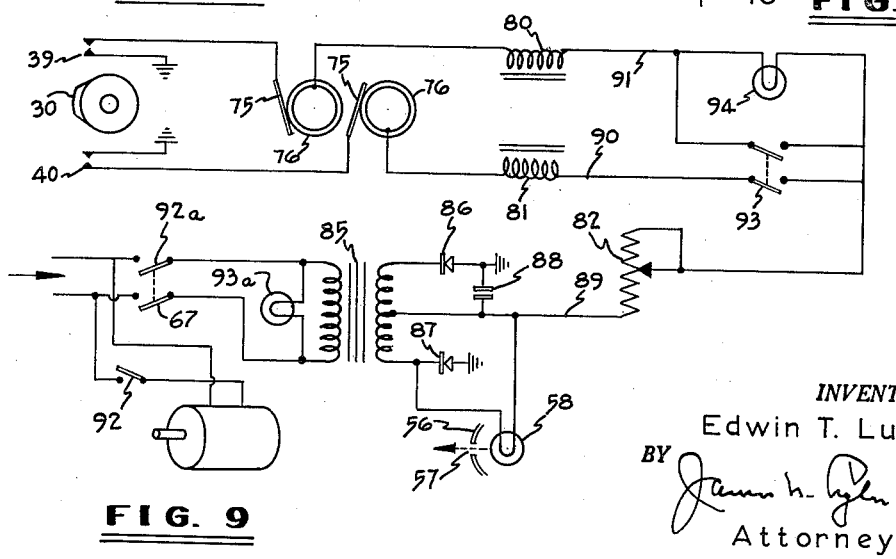

Oct. 29, 1963 E. T. LUMB 3,108,478
WHEEL BALANCING DEVICE
Filed Sept. 9, 1960 3 Sheets-Sheet 3

INVENTOR.
Edwin T. Lumb
BY
Attorney

United States Patent Office 3,108,478
Patented Oct. 29, 1963

3,108,478
WHEEL BALANCING DEVICE
Edwin T. Lumb, 829 NW. 143rd St., Miami, Fla.
Filed Sept. 9, 1960, Ser. No. 55,061
7 Claims. (Cl. 73—468)

This invention relates to an apparatus for balancing automobile wheels or other rotative bodies and has for one of its objects the provision of a device of this kind which will be easily operated; which will be relatively speedy in operation and which will provide accurate results.

It is an object of the invention to provide a balancing apparatus in which a controlled magnetic force is applied at the exact point and of the exact strength to cancel the effect of the misplaced weight so that there is no lag factor. In order to dynamically balance a body it must be rotated so that the dynamic unbalance is perpendicular to the axis of its rotation. This oscillating body being the cause. The passage of the misplaced weight precedes its reaction so that there is a lag in its reaction. This lag factor complicates the results obtained in other types of machines where the determination of dynamic unbalance is derived from the resulting oscillation rather than from the location of the misplaced weight.

In the present machine the magnetic compensation employed is the equivalent of placing a weight at the proper point to counter-balance the misplaced weight that is causing the unbalance. Thus, the present machine, dealing with the cause rather than with the effect, has no inherent lag factor to complicate the results obtained.

With these and other objects to be hereinafter set forth in view, I have devised the arrangement of parts to be described and more particularly pointed out in the claims appended hereto.

Figure 1:
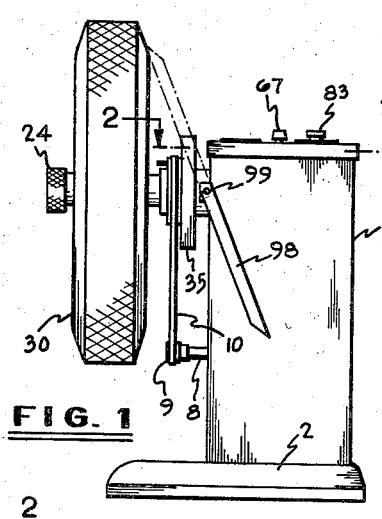
Figure 2:
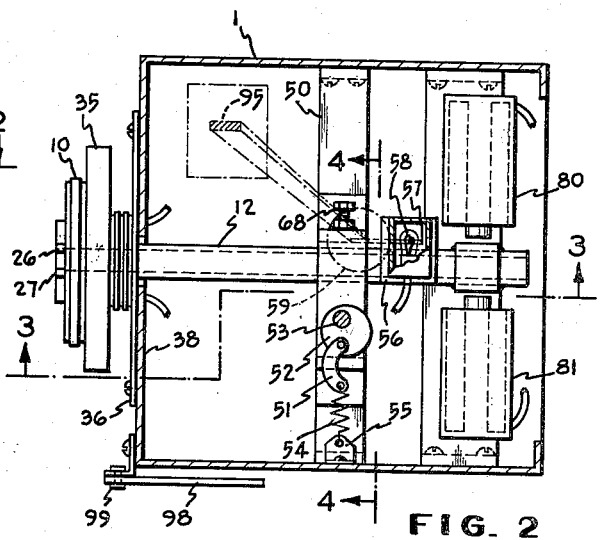
Figures 3, 4, 5:
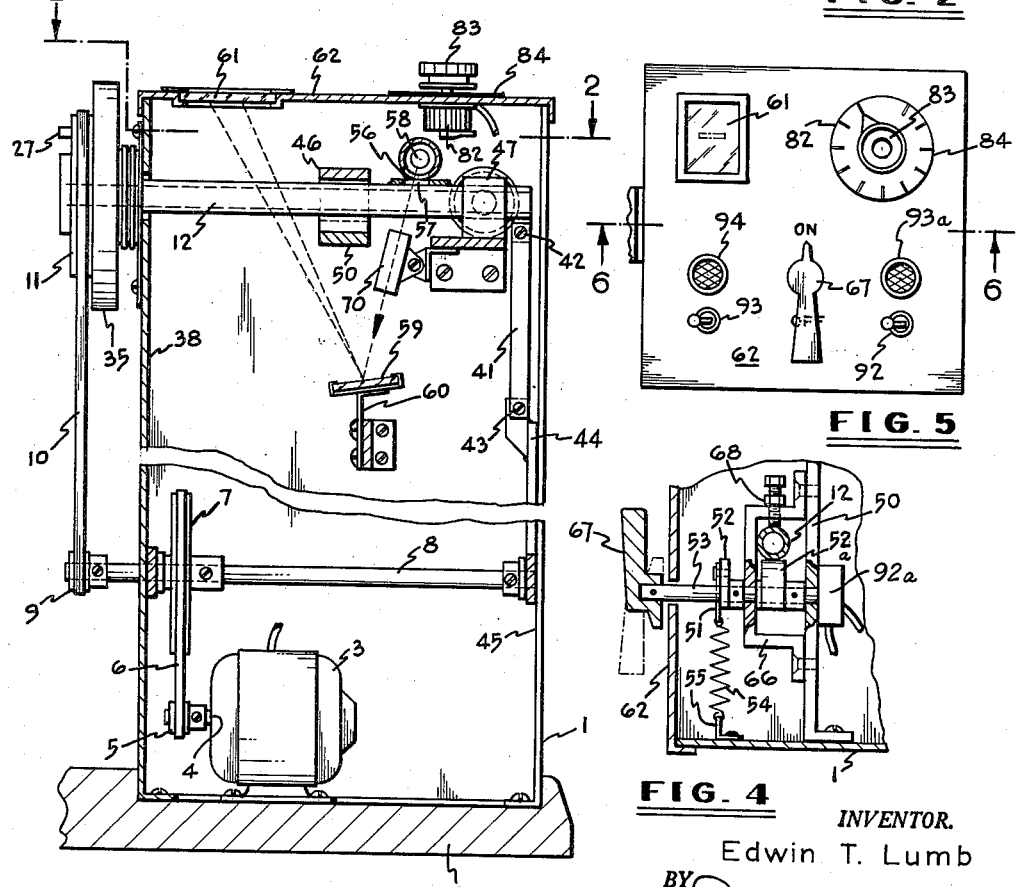

In the accompanying drawings, wherein an illustrative embodiment of the invention is disclosed, FIG. 1 is a side elevational view of a wheel-balancing apparatus constructed according to the invention, FIG. 2 is a sectional view on a horizontal plane, the view being taken substantially on the line 2—2 of FIG. 1, looking in the direction of the arrows, FIG. 3 is a sectional view taken substantially on the line 3—3 of FIG. 2, looking in the direction of the arrows, FIG. 4 is a sectional view taken substantially on the line 4—4 of FIG. 2, looking in the direction of the arrows, FIG. 5 is a top plan view of the cabinet or housing for the apparatus, FIG. 6 is an enlarged sectional view taken substantially on the line 6—6 of FIG. 5, looking in the direction of the arrows, FIG. 7 is a sectional view taken substantially on the line 7—7 of FIG. 6, looking in the direction of the arrows.

Figure 10:
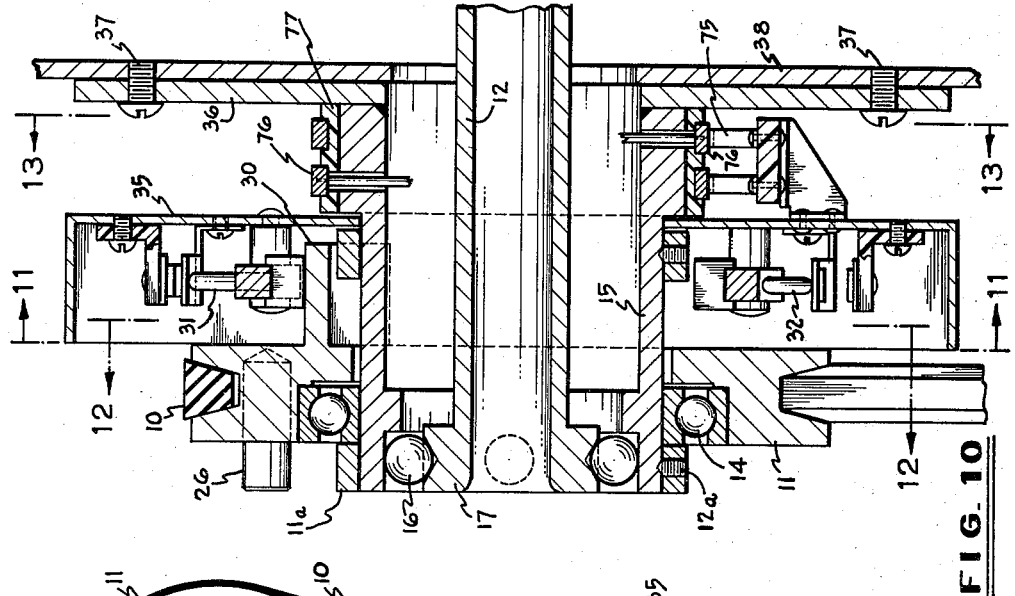
Figure 12:
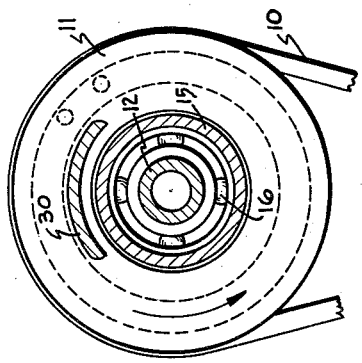
Figure 11:
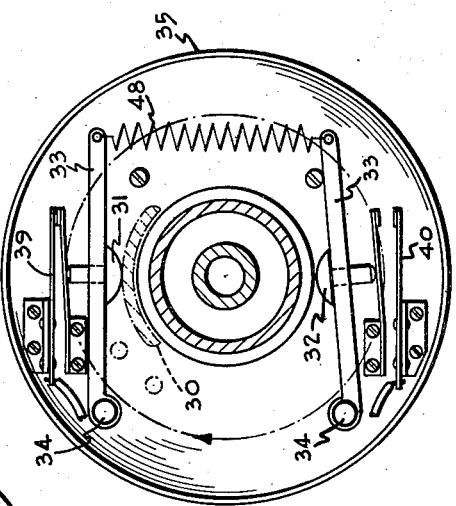
Figure 13:
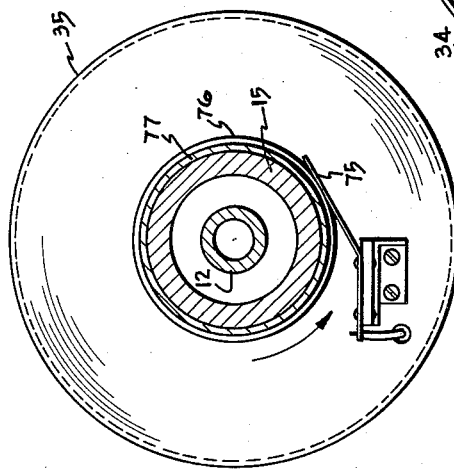

FIG. 8 is a sectional view taken substantially on the line 8—8 of FIG. 6, looking in the direction of the arrows, FIG. 9 shows the electrical circuit for the apparatus, FIG. 10 is a sectional view taken substantially on the line 10—10 of FIG. 7, looking in the direction of the arrows, FIG. 11 is a sectional view, taken substantially on the line 11—11 of FIG. 10, looking in the direction of the arrows, FIG. 12 is a sectional view taken substantially on the line 12—12 of FIG. 10, looking in the direction of the arrows, and FIG. 13 is a sectional view, taken substantially on the line 13—13 of FIG. 10, looking in the direction of the arrows.

The cabinet or housing in which most of the apparatus is contained, is generally indicated at 1, the same being suitably mounted upon a solid base 2. Mounted on the base 2 is an electric motor 3, furnished with electric current from an outlet of conventional type. The shaft 4 of the motor carries a pulley 5 engaged by a belt 6 which extends over a larger pulley 7 secured on a shaft 8 which extends across the interior of the cabinet and is mounted for rotation in suitable bearings secured to the side walls thereof. On the end of the shaft 8 externally of the cabinet is mounted a small pulley 9 engaged by a belt 10 which engages a pulley 11 surrounding a sleeve 12 extending around a non-rotative but axially movable shaft 13. A ball bearing 14 is interposed between the pulley 11 and a stationary hub or boss 15, while another ball bearing arrangement 16 is positioned between the hub 15 and a thickened end portion on the sleeve 12.

The tube 12 is so mounted at its forward end, or that shown in FIG. 10, that it is capable of a pivotal or slight wobbling movement. Such movement is attained by virtue of the balls 16 which operate in shallow sockets. One of these balls, or that shown at the bottom in FIG. 10, supports the shaft during its pivotal movement, the remaining three balls seen in FIG. 7, maintaining the proper spacing of the sleeve. The driving pulley 11 is maintained from axial displacement from the hub 15 by means of a collar 11a affixed to the hub 15 by a screw 12a.

To restrain the rear end of the tube, or that end of the tube 12 shown at the right in FIG. 6, from rising movement while the wheel to be balanced is in position as shown in FIG. 6, a flat spring 41 is provided, said spring having its upper end attached at 42 to the tube 12, and having its lower end secured at 43 to a plate 44 fastened to a wall 45 of the cabinet 1. This flat spring permits the sleeve or tube 12 to have a limited lateral movement at its rear end with very limited friction, such movement being also permitted by the supports 46 and 47 through which the tube or sleeve 12 extends.

When it is desired to lock the tube 12 against lateral movement, this is done by means of an eccentric disk 52 (FIG. 2), the same being eccentrically pivoted at 53, which pivot consists of a rod rotative in a bracket 66 on a cross bar 50 that extends between the side walls of the cabinet 1. A curved link 51 has one end pivotally attached to the eccentric disk 52 and has its other end attached to a spring 54, the opposite end of the spring being secured to a lug 55 attached to one of the walls of the cabinet. The spring tends to normally bias the eccentric disk to the inoperative position shown in FIG. 2. The pivot rod 53 extends through the top wall 62 of the cabinet and is fitted on the outside of said wall with a handle 67 by means of which the eccentric disk may be moved to operative or inoperative positions. A stop screw 68, adjustable in bracket 66 co-operates with the disk in maintaining the tube or sleeve 12 against movement when the disk is in the in-operative position shown in FIG. 4.

The handle 67 not only controls the operation of the eccentric tube-locking disk 52, but when said handle is in its "on" position as seen in FIG. 5, and when the switch 93 is closed it turns on the electric current to the magnets 80 and 81 to be described as well as to an indicating lamp shown at 94. In its "off" position the handle causes the application of the disk 52a against the tube or sleeve 12 while shutting off the flow of current to the magnets and lamp.

The wheel 18 and the tire 30 thereon to be balanced is adapted to be mounted on a tube 19 surrounding the shaft 13 which shaft constitutes a spindle or axle for the tube 19 and on which the tube is freely rotative. Ball bearings 20 and 21 are located between the tube 19 and the shaft or spindle 13. Secured on the tube 19 is frusto-conical disk 22 for cooperation with a cone 23 fitted around the tube 19 and axially adjustable thereon by means of a nut 24 threadably engaging the threads 25 provided on the tube. This arrangement is such that the cone 23, entering into the center opening in the wheel acts to center the wheel in relation to the shaft 13 while clamping the wheel against the dished or frusto-conical disk 22, thus causing the wheel to become coupled to the tube 19 and permitting it to be rotated by drive from the pulley 11.

The drive between the pulley 11 and the tube 19 is established by means of a pair of pins indicated respectively at 26 and 27 projecting from the face of the pulley 11 and adapted to receive between them a radially projecting finger constituting a dog 28 carried by the tube 19. By this arrangement the wheel may be mounted on the tube 19 and the shaft 13 then slid into the sleeve or tube 12.

In proceeding to balance the wheel, the first step is to secure static balance by inserting the shaft 13 into the tube or sleeve 12 to the extent approximately indicated in full lines in FIG. 6 wherein it will be noted that the shaft 13 has not been inserted sufficiently to cause the finger or dog 28 to engage between the pins 26 and 27. In this position the tube 19 is not coupled to the drive pulley 11 and hence the tube 19 and the wheel carried thereby can rotate freely on its ball bearings 20 and 21. Weights can now be added to the wheel rim at the top until the wheel will remain in any position, so that it will be statically balanced. The shaft 13 is then pushed all of the way into the tube or sleeve 12 until the finger or dog 28 engages the two pins 26 and 27 on the pulley 11. Through such clutch connection the wheel will be rotated when the motor 3 is set in operation by closure of the switch 92, after main switch 92a is closed. Lamp 93a indicates the closure of switch 92a.

Provided on the back of the pulley 11 is an arcuate cam 30 (FIG. 11) adapted for engagement successively with two switches 39 and 40 through two contact members 31 and 32. These contacts are spaced 180 degrees apart and each of the switches 39 and 40 is closed for ninety degrees of rotation of the wheel to be balanced. Each of the contacts 31 and 32 is mounted on a lever 33, pivoted at 34 in a drum adjustable rotatively around the hub 15, the hub being welded to a radial flange 36 secured by screws 37 to a wall 38 of the cabinet. Contact 31 is operative to close the switch 39 at the required time and contact 32 operates to close switch 40. A spring 43 extends between the levers 33 to normally bias the same in a direction toward open-switch position.

Attached under the rear end of the sleeve or tube 12 is a shadow vane 56, made of metal or other suitable opaque material, and said vane is provided with a narrow slit 57 near its center, said slit being parallel to the longitudinal axis of the tube or sleeve 12. The vane is so attached to the tube 12 that the slit 57 is disposed to one side of the tube so that a light beam projected from a lamp 58 located above the vane and through the slit therein can fall upon a mirror shown at 59. The mirror 59 is supported in a bracket 50 which can be either bent or otherwise adjusted to so position the mirror that a light beam reflected by it will be centered on a ground glass viewing screen 61 located in the top panel 62 of the cabinet.

Lenses contained at 70 and mounted in a tube serve to focus the light beam from the lamp 58, the path of the light beam from the lamp 58 to the ground glass viewing screen 61 being shown in dotted lines in FIG. 3.

The blades of the switches 39 and 40 are of spring stock so that these switches are normally open. One contact blade of each of these switches is insulated from the drum 35 and receives its electric current from a contact 75 travelling on a contact ring 76 secured to the wall 38 of the cabinet but insulated from it by an insulating ring 77. The second contact blade of each of the switches 39 and 40 is grounded to the drum 35.

The drum 35 is an azimuth control and it permits the operator to position the point at which the switches 39 and 40 will close in reference to the perimeter of the moving wheel by the rotative adjustment of the drum 35. Graduations may be provided in the periphery of the drum 35 so that azimuth setting of the drum can be read.

Located at diametrically opposite points in relation to the tube or sleeve 12 are electro-magnets indicated respectively at 80 and 81. A rheostat 82 is provided in the electrical circuit and the same has a knob 83 operative over a calibrated scale 84 which can be calibrated in ounces required to bring a typical wheel into balance. The rheostat is connected in the circuit as shown in FIG. 9, and it can be connected as a variable resistance in a series with the electro magnets or as a potentiometer with one end of the resistive element at the potential of the other battery pole. The latter connection provides the better range of adjustment. The electrical system employs a 24 volt step down transformer 85 with a center tapped winding. The rectifiers shown at 86 and 87 are silicon and are rated at 10 amps. and the capacitor shown at 88 serves to smooth out some of the ripple.

Current is supplied through wire 89 from the transformer and rectifiers to the rheostat 82 and thence through wire 90 to one of the contact rings 76. The movable contact member 75 for this ring passes the current to the live blade of the switch 40. When said switch closes, the current returns to ground through the grounded blade of said switch. Likewise wire 91 carries the current to switch 40. When the contacts for the switches close the same, they are operating in synchronism with the rotation of the wheel being balanced, and each time that the switches 39 and 40 close, the electric current will flow through the respective magnets 80 and 81. It will be apparent from this that a magnetic attractive force will be applied in the form of synchronized pulses to the rotating body and the strength of such pulses and their point of application with reference to the periphery of said body can be varied at will. This makes it possible to apply a force at the exact point of dynamic unbalance, of the exact amount of such unbalance and counter thereto, thereby effectively cancelling the dynamic unbalance in the rotating body. Achievement of this cancellation of dynamic unbalance is observable by means of magnified motion transmitted to the viewing glass 61. The light bar seen thereon will remain stationary when the azimuth control and rheostat are properly set.

The operation of the improved balancing apparatus is briefly as follows:

The wheel or other body to be balanced is mounted on the tube 19 in the manner previously described and this can be done while said tube and its shaft 13 are completely withdrawn from out of the tube or sleeve 12. The end of the shaft 13 is then inserted within sleeve 12 and moved thereinto to the position substantially shown in FIG. 6 and short of causing the dog 28 to engage the pins 26 and 27. While the parts are in this position, the wheel is statically balanced as was previously described. Weights are added to the wheel rim at the top until the wheel will remain in any position.

Shaft 13 is then inserted all the way into the sleeve or tube 12 until the dog or finger 28 enters between the pins 26 and 27, thus coupling the tube 19 and the wheel 18 carried there to the driving pulley 11. The motor 3 is then set in operation by closing switch 92 (FIG. 9). When the required rotative speed of the wheel is reached, the tube-locking handle 67 is moved to a position as shown in FIG. 5, which handle is operative to close switches 92a and cause illumination of the indicator lamp 58. Switch 93 is initially closed.

If the wheel is out of dynamic balance, the wheel and its axle composed of the tube 19 and its shaft 13, will oscillate and the bar of light, shown at 95 in FIG. 2 on the viewing screen, will have movement. The azimuth control drum 35 is then operated in conjunction with the rheostat 82 until the bar of light is made stationary. As the wheel is rotated the switches 39 and 40 are successively closed thereby applying pulses of current, for about 90 degrees of rotation, to the magnets. The strength of these pulses is varied by the calibrated rheostat 82. As the tube or sleeve 12 tries to move to the left, the right magnet will be energized and as it tries to move to the right the left magnet will be energized. When the pulses are applied in the proper phase and of proper strength all motion will be cancelled out. It is then only necessary to cease the operation of the apparatus and determine where the corrective pulse was applied and determine the point of attachment for the corrective weight. The calibration for the rheostat will provide the size required for the corrective weight.

By switching off the motor and opening the position-indicator switch 93, the wheel will cease turning, and it is then slowly rotated by hand in the same direction as that in which it was rotated by the motor. At the point where the lamp 94 just flashes on, the wheel is stopped, and a pointer shown at 98, pivoted at 99 on the cabinet 1, is swung up against the tire, as indicated in dotted lines in FIG. 1, to indicate the point on the inner rim edge of the wheel where the weight is to be applied. Similar weights, each of which is equal in weight to one half of the first weight, are applied respectively to the inner and outer tire rim edge at a point 180 degrees from the first weight to thereby maintain static balance.

The apparatus herein described is one which is very sensitive due to its friction-free suspension and minimal motion observable. It is speedy in use since once it is calibrated in ounces the first application of weights usually provides excellent results.

Having thus described a single embodiment of the invention, it is obvious that the same is not to be restricted thereto, but is broad enough to cover all structures coming within the scope of the annexed claims.

What I claim is:

1. A wheel-balancing apparatus comprising, a non-rotative sleeve mounted to permit lateral oscillatory movement, a pair of electro magnets between which the sleeve is positioned, successively-operated switches controlling the flow of current to the magnets, a spindle removably fitted within the non-rotative sleeve, a wheel mounting rotatively carried on the spindle, driving means for engagement with the wheel mounting to rotate the same and a wheel carried thereby, cam means carried by the driving means to operate the switches, and light-projection means carried by the sleeve to indicate the oscillatory movement of the same.

2. In a wheel-balancing apparatus, a rotative support for a wheel, a spindle within the support, a non-rotative sleeve receiving said support spindle within it with the support extending beyond the sleeve, magnetic means operative on the sleeve during oscillatory movements of the same, driving means including a pulley carried by and rotative relatively to the sleeve for rotating the support, switch means for controlling the energization of the magnetic means, switch-operating means in the form of a cam carried by the driving means, the switch means being mounted for shifting movement to thereby vary the position of such switch means in respect to the switch-operating means so that closure of the switch means will occur in coincidence with the passage of any desired part of the wheel past a given point, said switch means being used to control pulses of current to the magnetic means.

3. A wheel-balancing apparatus comprising, a sleeve mounted non-rotatively but having a limited lateral swing, a spring for limiting the swing of the sleeve, a pair of electro magnets between which the sleeve is positioned, a driving pulley rotative around the sleeve, a drum rotatively adjustable around the sleeve, switches carried by the drum and operative to control the flow of current to the electro magnets, cam means carried by the driving pulley for effecting successive closure of the switches, a spindle carrying a wheel mount, the wheel mount being freely rotative on the spindle, the spindle being removably fitted within the sleeve, and coupling means for establishing a driving connection between the pulley and the wheel mount, said coupling means comprising a finger projecting radially from the wheel mount and engaging between spaced projections extending axially from the drive pulley.

4. A wheel-balancing apparatus comprising, a non-rotative tubular sleeve mounted to permit wobbling movement, magnetic means between which the sleeve is mounted, the magnetic means being intermittently operative during the wobbling movement of said sleeve, a spindle, said spindle having a part projecting within the non-rotative tubular sleeve, a wheel support including a rotative outer sleeve concentric with the spindle, a wheel mounted on the rotative outer sleeve and being rotative with said outer sleeve around the spindle, said magnetic means comprising spaced magnets between which the non-rotative tubular sleeve is positioned, drive means for the rotative outer sleeve comprising a rotated pulley, said pulley carrying a cam and magnet-energizing means including switches operated by the cam when the pulley is rotating the rotative outer sleeve bearing the wheel.

5. A wheel-balancing apparatus comprising, a non-rotative sleeve mounted to permit lateral oscillatory movement, spring means connected at one end of the sleeve for permitting limited lateral movement of the sleeve, a pair of electro magnets between which the sleeve is positioned, successively-operated switches controlling the flow of current to the magnets, a spindle removably fitted within the sleeve and extending beyond one end of the same, a wheel mounting fitted around the part of the spindle that projects beyond the sleeve, a driving pulley mounted on and rotative around the sleeve, means for establishing a driving coupling between the wheel mounting and the driving pulley by longitudinal insertion of the spindle within the sleeve, a cam carried by the driving pulley for operating the switches, and light-projection means carried by the sleeve to indicate the oscillatory movement of the same.

6. A wheel-balancing apparatus as provided for in claim 5, including a rheostat for varying the pulses of current supplied to the magnets through the successively-operated switches, a drum rotatively adjustable around the driving pulley, the switches being carried by the drum and means for varying the positions of said switches by rotative adjustment of the drum and relatively to the cam means which operates them.

7. A wheel-balancing apparatus comprising, a non-rotative sleeve mounted for a limited pivotal swing, a bearing for supporting one end of the sleeve and permitting such swing, a leaf spring having one end attached to the second end of the sleeve and the second end of the spring being fixed, a pair of electro magnets between which the sleeve is positioned, a spindle fitted within the sleeve and axially shiftable to enable it to be removed from within the sleeve, a wheel mount rotatively fitted on the spindle and removable from the sleeve in company with the spindle, a drive pulley mounted on and rotative around the sleeve, a rotatively adjustable drum arranged around the sleeve behind the pulley, switches on the drum for controlling current flow to the electro magnets, cam means carried by the pulley for successively closing the switches during the rotative movement of the pulley, a finger extending radially from the wheel mount, pins projecting from the pulley and between which the finger enters on passage of the spindle into the sleeve to thereby cause the wheel mount to be rotated by the pulley, a light beam projector mounted on the sleeve, a mirror for receiving and reflecting the beam therefrom, and a viewing screen on which the beam is reflected by the mirror.

References Cited in the file of this patent
UNITED STATES PATENTS

| | | |
|---|---|---|
| 1,949,603 | Davey | Mar. 6, 1934 |
| 2,559,707 | Burke et al. | July 10, 1951 |
| 2,690,075 | Kryeske | Sept. 28, 1954 |
| 2,754,685 | Lansky | July 17, 1956 |
| 2,869,372 | Sihvonen | Jan. 10, 1959 |
| 3,035,448 | Gruber | May 22, 1962 |

FOREIGN PATENTS

| | | |
|---|---|---|
| 583,728 | Germany | Sept. 8, 1933 |
| 1,082,066 | Germany | May 19, 1960 |